United States Patent
Wu

(10) Patent No.: US 11,490,202 B2
(45) Date of Patent: Nov. 1, 2022

(54) DELAY ESTIMATION METHOD, ECHO CANCELLATION METHOD AND SIGNAL PROCESSING DEVICE UTILIZING THE SAME

(71) Applicant: Realtek Semiconductor Corp., HsinChu (TW)

(72) Inventor: Mu-Chen Wu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 1 day.

(21) Appl. No.: 17/373,772

(22) Filed: Jul. 13, 2021

(65) Prior Publication Data
US 2022/0060825 A1    Feb. 24, 2022

(30) Foreign Application Priority Data
Aug. 18, 2020   (TW) ................................ 109128004

(51) Int. Cl.
*H04R 3/00*    (2006.01)
*H04R 3/02*    (2006.01)

(52) U.S. Cl.
CPC ..................................... *H04R 3/02* (2013.01)

(58) Field of Classification Search
CPC .. H04R 3/00; H04R 3/005; H04R 3/02; G10L 21/0208; G10L 21/0216; G10L 21/0224; G10L 21/0232; G10L 21/0264; G10L 2021/02082; G10L 2021/02163; G10L 2021/02165; G10K 11/16; G10K 11/175; G10K 11/1752; G10K 11/178; G10K 11/17815; G10K 11/17817; H04M 9/08; H04M 9/082; H04B 3/23; H04B 3/231; H04B 3/235; H04B 3/237
See application file for complete search history.

(56) References Cited

U.S. PATENT DOCUMENTS 8,750,494 B2    6/2014  Etter
9,997,151 B1*   6/2018  Ayrapetian .......... G10L 21/0208
(Continued)

OTHER PUBLICATIONS

Heping Ding, "Drift-Compensated Adaptive Filtering for Improving Speech Intelligibility in Cases with Asynchronous Inputs", EURASIP Journal on Advances in Signal Processing vol. 2010, Article ID 621064, 12 pages, Jan. 4, 2010.

*Primary Examiner* — Thang V Tran
(74) *Attorney, Agent, or Firm* — Winston Hsu

(57) ABSTRACT

A signal processing device includes an echo estimation device, a captured signal buffer device and a delay estimation device. The echo estimation device generates an echo estimation signal according to a reference signal and a set of reflection path simulation coefficients and compensates the echo estimation signal according to a first delay to generate a compensated echo estimation signal. The captured signal buffer device buffers a captured signal captured by microphone device and outputs the captured signal according to a second delay to generate a compensated captured signal. The delay estimation device estimates an amount of delay adjustment according to the compensated echo estimation signal and the compensated captured signal and updates the first delay or the second delay according to the amount of delay adjustment. A difference between an upper bound and a lower bound of the first delay is smaller than or equal to 1.

15 Claims, 5 Drawing Sheets

(56) References Cited

U.S. PATENT DOCUMENTS

| | | | | |
|---|---|---|---|---|
| 11,107,488 B1* | 8/2021 | Mansour | ................ | H04R 1/406 |
| 2003/0039353 A1* | 2/2003 | Matsuo | ................ | H04M 9/082 |
| | | | | 379/406.01 |
| 2014/0003635 A1* | 1/2014 | Mohammad | ........... | H04R 3/005 |
| | | | | 381/306 |
| 2015/0078564 A1* | 3/2015 | Guo | ...................... | H04M 9/082 |
| | | | | 381/66 |
| 2015/0249885 A1* | 9/2015 | Kawabata | ................ | H04B 3/23 |
| | | | | 381/66 |
| 2016/0134759 A1* | 5/2016 | Mani | ..................... | H04B 3/237 |
| | | | | 379/406.08 |
| 2017/0372722 A1* | 12/2017 | Li | ........................... | H04B 3/23 |
| 2021/0051404 A1* | 2/2021 | Li | ........................ | H04M 9/082 |

\* cited by examiner

DELAY ESTIMATION METHOD, ECHO CANCELLATION METHOD AND SIGNAL PROCESSING DEVICE UTILIZING THE SAME

BACKGROUND OF THE INVENTION

1. Field of the Invention

The invention relates to a delay estimation method and associated signal processing device, more particularly to a delay estimation method applied to cancel echo and signal processing device utilizing the same.

2. Description of the Prior Art

When a near-end user uses a microphone and a speaker to communicate with a far-end user over the network, interference of echo will be generated since the sound played by the speaker will be received at the same time when the microphone is receiving the voice of the near-end user. Here, the echo refers to the sound played by the speaker, reflected in the environment and then received by the microphone. For applications such as Voice Over IP (VOIP) or Voice Recognition (VR), both echo and environmental noise are regarded as interference factors, which will reduce the quality of the voice communication or reduce the recognition rate. Acoustic Echo Cancelling (AEC) is a technology used to solve echo interference.

Echo cancellation technology is to input the sound signal (reference signal) to be played by the speaker into the filter that simulates the reflection environment to obtain the echo estimation value, and then subtract the echo estimation value from the sound received by the microphone (captured signal) to achieve an echo cancellation result.

However, since the microphone used for capturing sound in the system and the speaker used for rendering sound in the system are different hardware devices, there is usually a problem of clock un-synchronization between the two devices. When the sampling frequency used by the microphone and the speaker are different, it will directly affect the effect of echo cancellation. In addition, the sampling frequency difference between the microphone and the speaker is usually a time-varying factor, which makes it difficult for AEC to respond to the frequency change in real time, and therefore the echo cannot be completely cancelled or eliminated.

In view of this, a delay estimation method is needed to adaptively estimate the time delay between the reference signal and the captured signal, and the estimated delay is used to compensate the echo signal and the captured signal, so that the echo can be effectively eliminated or canceled by the AEC.

SUMMARY OF THE INVENTION

It is an objective of the invention to solve the problem of the time delay between the reference signal and the captured signal that varies with time due to different sampling frequencies.

According to an embodiment of the invention, a signal processing device comprises an echo estimation device, a captured signal buffer device and a delay estimation device. The echo estimation device is configured to generate an echo estimation signal according to a reference signal and a set of reflection path simulation coefficients, and compensate the echo estimation signal according to a first delay to generate a compensated echo estimation signal. The captured signal buffer device is configured to buffer a captured signal captured by a microphone device and output the captured signal according to a second delay to generate a compensated captured signal. The delay estimation device is coupled to the echo estimation device and the captured signal buffer device and configured to estimate an amount of delay adjustment according to the compensated echo estimation signal and the compensated captured signal and update the first delay or the second delay according to the amount of delay adjustment. A difference between an upper bound and a lower bound of the first delay is smaller than or equal to 1.

According to another embodiment of the invention, a delay estimation method comprises: compensating an echo estimation signal according to a first delay to generate a compensated echo estimation signal; outputting a captured signal captured by a microphone device according to a second delay to generate a compensated captured signal; estimating an amount of delay adjustment according to the compensated echo estimation signal and the compensated captured signal; and updating the first delay or the second delay according to the amount of delay adjustment. The first delay is smaller than an upper bound and greater than a lower bound, and a difference between the upper bound and the lower bound of the first delay is smaller than or equal to 1.

According to yet another embodiment of the invention, an echo cancellation method comprises: generating an echo estimation signal according to a reference signal and a set of reflection path simulation coefficients; compensating the echo estimation signal according to a first delay to generate a compensated echo estimation signal; outputting a captured signal captured by a microphone device according to a second delay to generate a compensated captured signal; subtracting the compensated echo estimation signal from the compensated captured signal to generate an output signal; estimating an amount of delay adjustment according to the compensated echo estimation signal and the compensated captured signal; and updating the first delay or the second delay according to the amount of delay adjustment. The first delay is a value smaller than 1 and the second delay is an integer value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
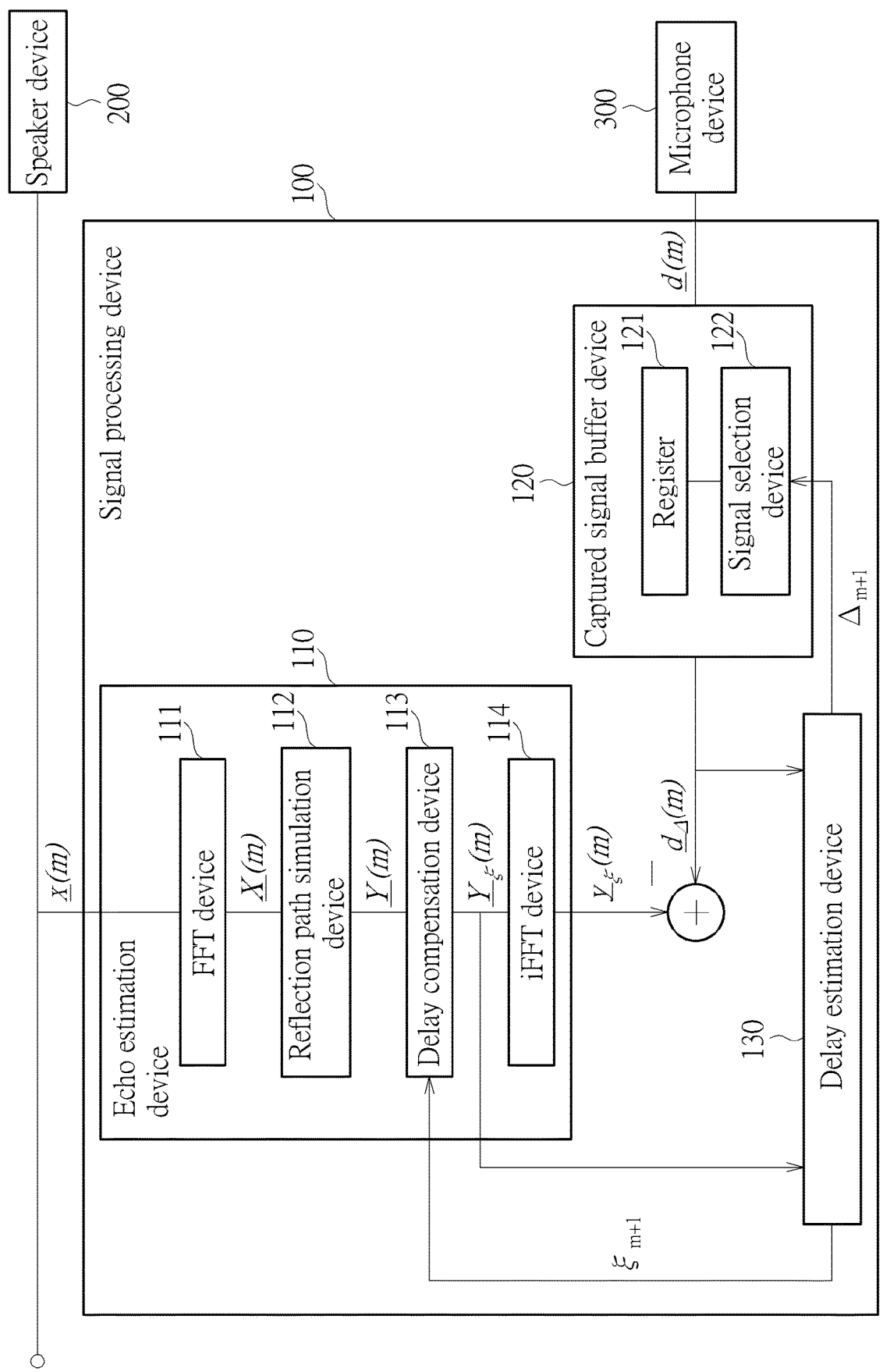
FIG. 1 shows an exemplary block diagram of a signal processing device according to an embodiment of the invention.

FIG. 1 shows an exemplary block diagram of a signal processing device according to an embodiment of the invention. The signal processing device 100 may be configured to perform delay estimation, delay compensation, and echo cancellation, comprising estimating the time delay between the reference signal and the captured signal, respectively compensating the echo signal and the captured signal according to the estimated time delay and using the compensated signals to perform echo cancellation, thereby effectively cancelling the echo.

The signal processing device 100 may at least comprise an echo estimation device 110, a captured signal buffer device 120 and a delay estimation device 130. The echo estimation device 110 is coupled to a signal supply path, this signal supply path is further coupled to a speaker device 200 for providing the sound signal to be played to the speaker device 200. The echo estimation device 110 may be configured to receive the sound signal from the signal supply path as a reference signal $\underline{x}(m)$, wherein the reference signal $\underline{x}(m)$ is a time domain sampling signal. In the embodiments of the invention, the echo cancellation is a block-wise processing performed on the signal. Therefore, the reference signal $\underline{x}(m)$ may be a vector comprising a plurality of sampling points, and may be expressed as the following equation Eq. (1):

$$\underline{x}(m)=[x(mN+N-L), \ldots, x(mN), x(mN+1), \ldots, x(mN+N-1)]^T \quad \text{Eq. (1)}$$

where N represents the hop length (the number of sampling points) of each processing performed by the signal processing device 100, L represents the length of Fast Fourier Transform (FFT) and m represents the m-th processing frame.

The echo estimation device 110 may be configured to generate an echo estimation signal according to the reference signal $\underline{x}(m)$ and a set of reflection path simulation coefficients, and compensate the echo estimation signal according to a first delay to generate a compensated echo estimation signal.

The echo estimation device 110 may comprise an FFT device 111, a reflection path simulation device 112, a delay compensation device 113 and an inverse FFT (iFFT) device 114.

The FFT device 111 may be configured to convert the reference signal $\underline{x}(m)$ from a time domain signal to a frequency domain signal. The FFT device 111 may perform the FFT by performing the calculation expressed in the following equation Eq. (2):

$$\underline{X}(m)=F \times \underline{x}(m) \quad \text{Eq. (2)}$$

where F represents the discrete Fourier transform matrix and $\underline{X}(m)$ represents the frequency domain reference signal.

The reflection path simulation device 112 may be configured to generate the echo estimation signal according to the frequency domain reference signal $\underline{X}(m)$ and a set of reflection path simulation coefficients. The reflection path simulation device 112 may generate the echo estimation signal by performing the calculation expressed in the following equation Eq. (3):

$$\underline{Y}(m)=\underline{X}(m) \cdot \underline{H}(m) \quad \text{Eq. (3)}$$

where the operator "·" represents the "dot product" (that is, element-wise multiplication), $\underline{H}(m)$ represents the frequency domain filter coefficients of a filter, this filter is utilized to simulate the channel response of the reflection path of the sound signal reflected from the speaker to the microphone device and $\underline{Y}(m)$ represents the obtained echo estimation signal, which is a frequency domain signal.

In the embodiment of the invention, the delay between the reference signal $\underline{x}(m)$ and the captured signal $\underline{d}(m)$ captured by the microphone device 300 due to different sampling frequencies may be divided into two parts, including a fractional delay (hereinafter referred to as the first delay) and an integer delay (hereinafter referred to as the second delay), which are respectively used to compensate the echo estimation signal and the captured signal.

The delay compensation device 113 may be configured to compensate the echo estimation signal $\underline{Y}(m)$ according to the first delay, to generate the compensated echo estimation signal $\underline{Y}_\xi(m)$. The delay compensation device 113 may generate the compensated echo estimation signal by performing the calculation expressed in the following equation Eq. (4):

$$\underline{Y}_\xi(m)=\underline{Y}(m) \cdot \Psi(\xi_m) \quad \text{Eq. (4)}$$

where the delay compensation device 113 compensates for the delay by phase shifting the frequency domain signal. $\xi_m$ represents the currently obtained value of the first delay. The $\xi_m$ in each iteration may be the value of the first delay updated from the previous iteration and may be set to a default value or an initial value in the first iteration, for example, but not limited to, set to 0. $\Psi(\xi_m)$ is a phase shift vector and may be expressed in the following equation Eq. (5):

$$\Psi(\xi_m) = \left[ e^{-j\frac{2\pi 0}{L}\xi_m}, e^{-j\frac{2\pi 1}{L}\xi_m}, \ldots e^{-j\frac{2\pi(L-1)}{L}\xi_m} \right]^T \quad \text{Eq. (5)}$$

The compensated echo estimation signal $\underline{Y}_\xi(m)$ may be repeatedly provided to the delay estimation device 130 in each iteration of updating/estimating the delay.

The iFFT device 114 may be configured to convert the compensated echo estimation signal $\underline{Y}_\xi(m)$ from a frequency domain signal to a time domain signal, and the time domain signal may be provided for subsequent echo cancellation operations. The iFFT device 114 may perform iFFT by performing the calculation expressed in the following equation Eq. (6):

$$\underline{y}_\xi(m)=[0 I] \times F^{-1} \times \underline{Y}_\xi(m) \quad \text{Eq. (6)}$$

where the matrix [0 I] is utilized for eliminating the distortion caused by the circular convolution, 0 is a matrix of all zeros, I is the identity matrix, and $F^{-1}$ represents the discrete iFFT matrix.

The captured signal buffer device 120 may comprise a register 121 and a signal selection device 122. The register 121 may be configured to temporarily store the captured signal $\underline{d}(m)$ of a predetermined number of sampling points (equivalent to a predetermined length, for example, 10 ms). The signal selection device 122 may be configured to output the captured signal $\underline{d}(m)$ according to the second delay. For example, the signal selection device 122 may determine the start sampling point and end sampling point of the captured signal $\underline{d}(m)$ to be output according to the second delay, and output the sampling points between the start sampling point and the end sampling point as the compensated captured signal $\underline{d}_\Delta(m)$. The compensated captured signal $\underline{d}_\Delta(m)$ may be expressed as the following equation Eq. (7):

$$\underline{d}_\Delta(m)=[d(mN+\Delta_m), \ldots, d(mN+N-1+\Delta_m), \ldots, d(mN+N-1+\Delta_m)]^T \quad \text{Eq. (7)}$$

where the $\Delta_m$ represents the currently obtained value of the second delay. The $\Delta_m$ in each iteration may be the value of the second delay updated from the previous iteration and may be set to a default value or an initial value in the first iteration, for example, but not limited to, set to 0.

According to an embodiment of the invention, in each iteration, the delay estimation device 130 is configured to use the compensated echo estimation signal $\underline{Y}_\xi(m)$ and the compensated captured signal $\underline{d}_\Delta(m)$ to re-estimate the values of the first delay $\xi_{m+1}$ and the second delay $\Delta_{m+1}$ to be provided for the next iteration, where the subscript m represents the m-th processing frame.

The delay estimation device 130 may estimate an amount of delay adjustment based on the compensated echo estimation signal $\underline{Y}_\xi(m)$ and the compensated captured signal $d_\Delta(m)$, and determine whether to update or adjust one or more of the first delay $\xi_m$ and the second delay $\Delta_m$ according to the amount of delay adjustment.

Figure 2:
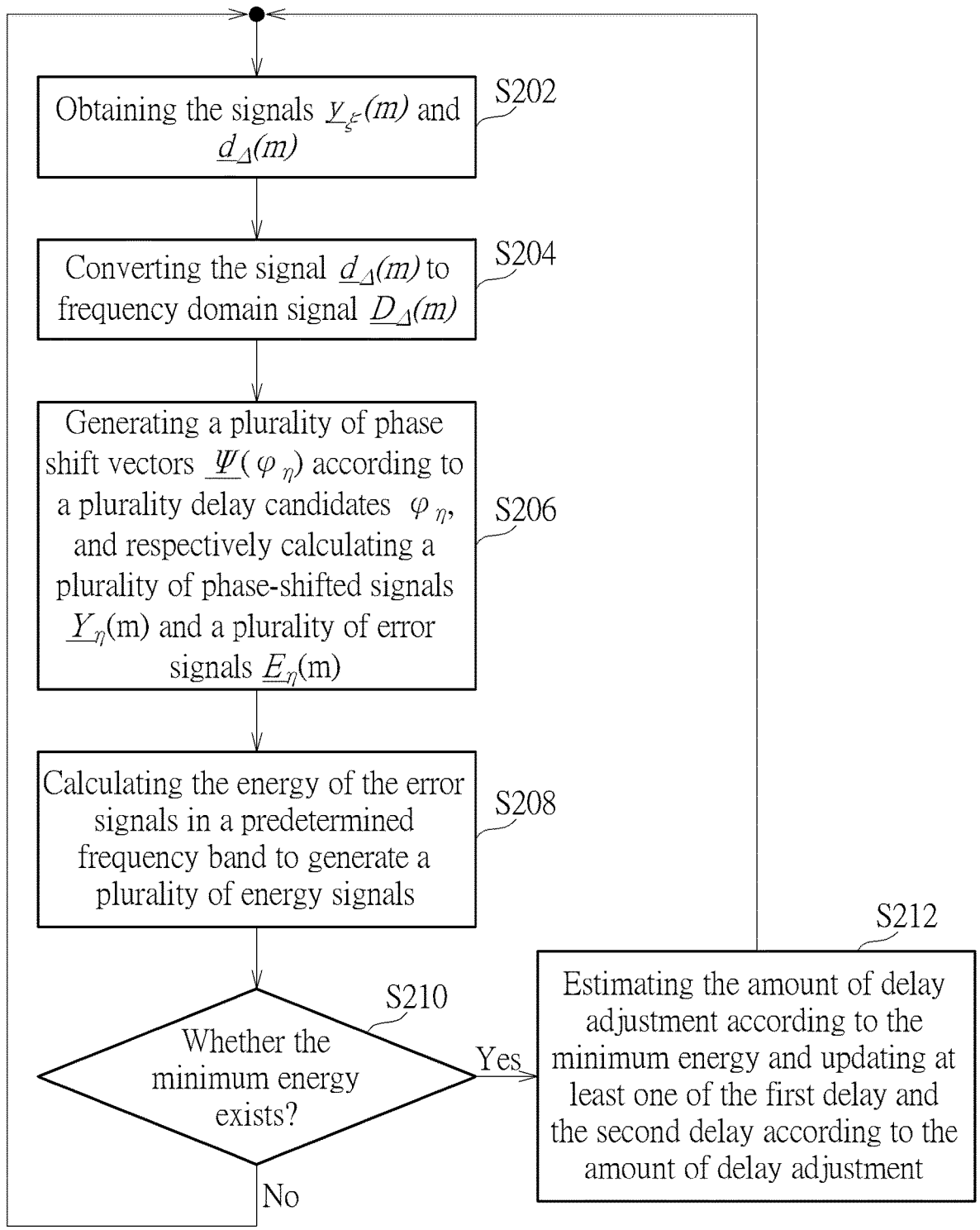
FIG. 2 shows an exemplary diagram of delay estimation according to an embodiment of the invention.

FIG. 2 shows an exemplary diagram of delay estimation according to an embodiment of the invention. The operations of delay estimation performed by the delay estimation device 130 may comprise the following steps:

Step S202: Obtaining the compensated echo estimation signal $\underline{Y}_\xi(m)$ and the compensated captured signal $\underline{d}_\Delta(m)$.

Step S204: Converting the compensated captured signal $\underline{d}_\Delta(m)$ from a time domain signal to a frequency domain signal $\underline{D}_\Delta(m)$. The delay estimation device 130 may perform FFT by performing calculation expressed in the following equation Eq. (8):

$$\underline{D}_\Delta(m) = F \times \underline{d}'_\Delta(m) \qquad \text{Eq. (8)}$$

where $$\underline{d}'_\Delta(m) = \begin{bmatrix} 0 \\ \underline{d}_\Delta(m) \end{bmatrix},$$

which is a zero-padded result after padding the signal $\underline{d}_\Delta(m)$ with zeros by using an all zero vector.

Step S206: generating a plurality of phase shift vectors $\underline{\Psi}(\varphi_\eta)$ according to a plurality delay candidates $\varphi_\eta$, using the phase shift vectors $\underline{\Psi}(\varphi_\eta)$ to calculate a plurality of phase-shifted signals $\underline{Y}_\eta(m)$ and respectively calculating a plurality of error signals $\underline{E}_\eta(m)$.

In the embodiments of the invention, the delay estimation device 130 may first set the plurality delay candidates $\varphi_\eta$, and the delay candidates $\varphi_\eta$ may satisfy the following equation Eq. (9):

$$v_L \leq \varphi_{-K} < \ldots < \varphi_{-1} < \varphi_0 < \varphi_1 < \ldots < \varphi_K \leq v_u \qquad \text{Eq. (9)}$$

where $-K \leq \eta \leq K$, $\eta$ is an index of the delay candidate used for fine-tuning the first delay $\xi_m$, the lower bound $v_L$ of the fine-tune value is between −1 and 0, and the upper bound $v_u$ of the fine-tune value is between 0 and 1. The plurality of phase shift vectors $\underline{\Psi}(\varphi_\eta)$ may be obtained by bringing each delay candidate into equation Eq. (5).

After obtaining $(2K+1)$ phase shift vectors $\underline{\Psi}(\varphi_\eta)$, the delay estimation device 130 is configured to calculate $(2K+1)$ phase-shifted signals $\underline{Y}_\eta(m)$ by using the phase shift vectors $\underline{\Psi}(\varphi_\eta)$ as the following equation Eq. (10) and calculate $(2K+1)$ error signals $\underline{E}_\eta(m)$ by using the frequency domain compensated captured signal $\underline{D}_\Delta(m)$ and the phase-shifted signals $\underline{Y}_\eta(m)$ as the following equation Eq. (11).

$$\underline{Y}_\eta(m) = \underline{Y}_\xi(m) \cdot \underline{\Psi}(\varphi_\eta) \qquad \text{Eq. (10)}$$

$$\underline{E}_\eta(m) = \underline{D}_\Delta(m) - \underline{Y}_\eta(m) \qquad \text{Eq. (11)}$$

where $\underline{E}_\eta(m)$ represents the difference between the compensated captured signal $\underline{D}_\Delta(m)$ and the phase-shifted signals $\underline{Y}_\eta(m)$, which are the results of fine-tuning the compensated echo estimation signal $\underline{Y}_\xi(m)$ based on different fine-tune values. In the embodiments of the invention, the delay estimation device 130 is trying to find out a better delay around the currently obtained first delay $\xi_m$. The smaller the difference, the more likely it is to have found out the actual delay between the echo estimation signal and the captured signal.

Step S208: Calculating the energy of the error signals in a predetermined frequency band to generate a plurality of energy signals, and find the minimum value of the energy signals. The delay estimation device 130 may calculate the energy of the error signals based on the following equation Eq. (12):

$$P_E(m,\eta) = \Sigma_k |E_\eta(m,k)|^2 \qquad \text{Eq. (12)}$$

where k represents the frequency in the predetermined frequency band, and the invention does not limit the range of the predetermined frequency band. Therefore, the operation of summing up the energy $\Sigma_k$ may be performed for the entire frequency domain or for a certain frequency band.

It should be noted that the $\underline{E}_\eta(m)$, which is a frequency domain signal and a vector, is the error signal of the m-th processing frame. As the other frequency domain signals mentioned above, $\underline{E}_\eta(m)$ may contain L elements, where L represents the length of the FFT. Therefore, the $\underline{E}_\eta(m)$ in Eq. (11) is a simplified representation of $E_\eta(m, k)$ in Eq. (12). That is, $\underline{E}_\eta(m)$ can actually be expressed as $\underline{E}_\eta(m, k) = [E_\eta(m, 0), E_\eta(m, 1), \ldots, E_\eta(m, L-1)]^T$, where $0, 1, \ldots, (L-1)$ represent the value of the frequency index k, and the actual value corresponding to each frequency index may be expressed as $$\frac{2\pi 0}{L}, \frac{2\pi 1}{L}, \ldots, \frac{2\pi(L-1)}{L}.$$

In addition, in some embodiments of the invention, the delay estimation device 130 may further perform recursive smoothing on the calculated energy, such as the following first-order recursive smoothing shown in Eq. (13):

$$\tilde{P}_E(m,\eta) = \alpha \tilde{P}_E(m-1,\eta) + (1-\alpha) P_E(m,\eta), 0 \leq \alpha < 1 \qquad \text{Eq. (13)}$$

According to an embodiment of the invention, the delay estimation device 130 may directly take the minimum value from the plurality of energy signals calculated in step S208. For example, find out the minimum value of the energy signals and the value of the index $\check{\eta}$ of delay candidate corresponding to the minimum value as the following Eq. (14):

$$\check{\eta} = \arg\min_\eta \tilde{P}_E(m,\eta) \qquad \text{Eq. (14)}$$

Figure 3:
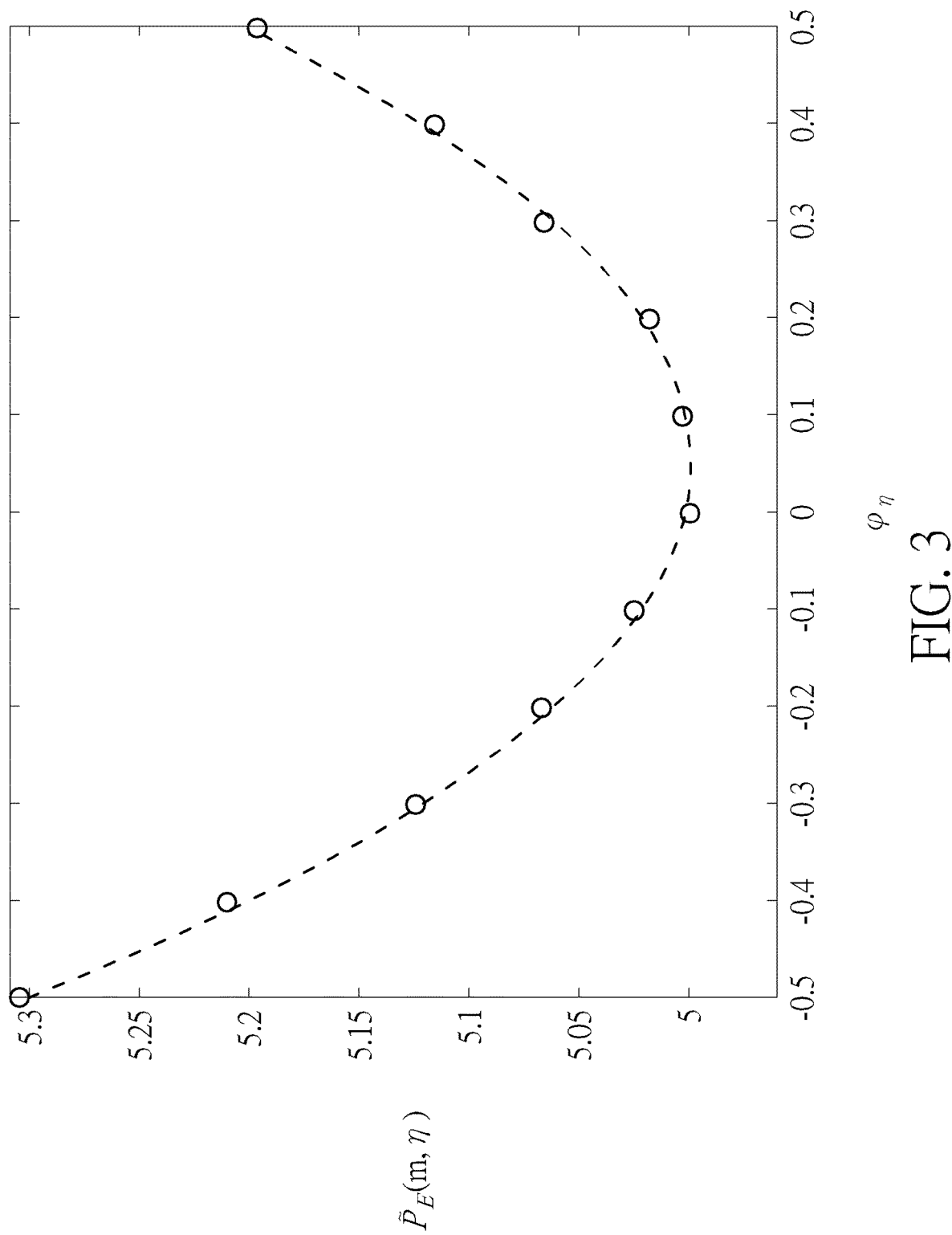
FIG. 3 shows an exemplary curve of energy versus delay according to an embodiment of the invention.

According to another embodiment of the invention, when taking the values of the delay candidates $\varphi_\eta$ as the values in the X-axis and taking the energy as the values in the Y-axis, and mark the positions of the points of the energy signals $P_E(m, \eta)$ or $\tilde{P}_E(m, \eta)$ in the two-dimensional plane formed by the delay candidates and the energy, a curve, such as the energy curve with respect to different delays as shown in FIG. 3, may be formed by these points, where the circles in FIG. 3 are the points of the energy signals calculated in step S208.

In order to estimate the amount of delay adjustment more accurately, the delay estimation device 130 may perform curve fitting on these points so as to try to find out the curve comprising these points (such as the curve shown in FIG. 3) and its corresponding formula, and find out the minimum energy and the delay candidate corresponding to the minimum energy through the formula of the curve, where the minimum energy may not be equal to the value of the energy obtained in step S208, and the delay candidate corresponding to the minimum energy may not be equal to the delay candidate $\varphi_n$ set by the delay estimation device 130 and may be outside of the range $v_L \sim v_U$. In other words, in step S208, the delay estimation device 130 may also find out the amount of delay which minimize the energy of the error signal by performing curve fitting, and the amount of delay may not be equal to a value selected from the delay candidates $\varphi_n$ that was set by the delay estimation device 130, and may be a value different from the delay candidates $\varphi_n$.

If this curve is a parabola with an opening downward, it means that the minimum energy does not exist.

If this curve is not a parabola in which the minimum energy does not exist, the delay estimation device 130 may find out the delay candidate corresponding to the minimum energy on the curve via the curve formula as the fine-tune value of the first delay. However, if a difference between the delay candidate corresponding to the minimum energy and upper bound $v_U$ and the lower bound of $v_L$ of the fine-tune value is greater than a certain value, the delay estimation device 130 may also determine that the minimum energy does not exist because the currently obtained fine-tune value is unreasonable.

Step S210: Determining whether the minimum energy (e.g. the minimum value of the energy signals) exists. If not, it does not exist, the current delay estimation result will be discarded (that is, do not update the current estimation, and make $\xi_{m+1}=\xi_m$, $\Delta_{m+1}=\Delta_m$). If it exists, at least one of the first delay and the second delay $\Delta_m$ will be updated in step S212.

Step S212: Estimating the amount of delay adjustment according to the minimum energy and updating the value of at least one of the first delay $\xi_{m+1}$ and the second delay $\Delta_{m+1}$ according to the amount of delay adjustment.

Suppose that the delay estimation device 130 sets the amount of delay adjustment as $\varphi'$ (in some embodiments, it may be a value $\varphi_n$ selected from the delay candidates) according to the delay candidate corresponding to the minimum energy found by the aforementioned method, the delay estimation device 130 may adjust the first delay according to the amount of delay adjustment to generate a first value $\xi'_{m+1}$ as the following equation Eq. (15):

$$\xi'_{m+1}=\xi_m+\mu\times\varphi' \quad \text{Eq. (15)}$$

where $\mu$ is the step of adjustment, for avoiding the oscillations caused by estimation errors or environmental noise. The delay estimation device 130 may set $\mu \leq 1$. Next, the delay estimation device 130 may determine whether to adjust the first delay $\xi_{m+1}$ and the second delay $\Delta_{m+1}$ according to the first value as the following equation Eq. (16):

$$\begin{cases} \xi_{m+1}=\xi'_{m+1}-1, \Delta_{m+1}=\Delta_m+1, & \text{if } \xi'_{m+1} \geq \Omega_U \\ \xi_{m+1}=\xi'_{m+1}+1, \Delta_{m+1}=\Delta_m-1, & \text{if } \xi'_{m+1} \leq \Omega_L \end{cases} \quad \text{Eq. (16)}$$

where $\Omega_U$ is a preset upper bound and $\Omega_L$ is a preset lower bound. In an embodiment of the invention, the upper bound and the lower bound may be set as $\Omega_U=0.5$ and $\Omega_L=-0.5$, to control the range of the first delay as $-0.5<\xi<0.5$.

To be more specific, the delay estimation device 130 may determine whether the first value $\xi'_{m+1}$ is smaller than upper bound $\Omega_U$ and greater than the lower bound $\Omega_L$. If yes, the delay estimation device 130 directly updates the first delay $\xi_{m+1}$ based on the first value $\xi'_{m+1}$ (that is, by setting $\xi_{m+1}=\xi'_{m+1}$), and does not update the currently estimated second delay (that is, by setting $\Delta_{m+1}=\Delta_m$).

If the first value $\xi'_{m+1}$ is not smaller than upper bound $\Omega_U$, the delay estimation device 130 may reduce the first value $\xi'_{m+1}$ to update the first delay $\xi_{m+1}$ as in equation Eq. (16) (that is, by setting $\xi_{m+1}=\xi'_{m+1}-1$ to obtain the updated first delay $\xi_{m+1}$) and increase the second delay $\Delta_m$ to update the second delay $\Delta_{m+1}$. (that is, by setting $\Delta_{m+1}=d_m+1$ to obtain the updated second delay $\Delta_{m+1}$). On the other hand, if the first value $\xi'_{m+1}$ is not greater than lower bound $\Omega_L$, the delay estimation device 130 may increase the first value $\xi'_{m+1}$ to update the first delay $\xi_{m+1}$ as in equation Eq. (16) (that is, by setting $\xi_{m+1}=\xi'_{m+1}$ to obtain the updated first delay $\xi_{m+1}$) and reduce the second delay $\Delta_m$ to update the second delay $\Delta_{m+1}$. (that is, by setting $\Delta_{m+1}=\Delta_m-1$ to obtain the updated second delay $\Delta_{m+1}$).

It should be noted that, in the embodiments of the invention, a difference between the upper bound $\Omega_U$ and the lower bound $\Omega_L$ of the first delay $\xi$ is smaller than or equal to 1. In other words, in the embodiments of the invention, in each iteration, no matter whether the value of the first delay $\xi$ is updated or not, the value of the first delay $\xi$ will be limited within the range defined by the upper bound $\Omega_U$ and the lower bound $\Omega_L$.

In addition, in the embodiments of the invention, the first delay $\xi$ is a value smaller than 1, for example, a fraction smaller than 1, and the second delay is an integer value. By limiting the range of the value of the first delay $\xi$, the error generated by performing the phase shift operation is effectively controlled, thereby efficiently and accurately estimating the amount of delay adjustment.

In addition, in the embodiments of the invention, after updating the first delay or the second delay, the delay estimation device 130 is further configured to provide the updated first delay $\xi_{m+1}$ to the echo estimation device 110 and provide the updated second delay $\Delta_{m+1}$ to the captured signal buffer device 120. The echo estimation device 110 and the captured signal buffer device 120 may repeatedly compensate for the signal delay according to the newly obtained first delay and the second delay. The delay estimation device 130 may repeatedly receive the compensated echo estimation signal and the compensated captured signal from the echo estimation device 110 and the captured signal buffer device 120, estimate the amount of delay adjustment according to the compensated echo estimation signal and the compensated captured signal and update the first delay or the second delay according to the amount of delay adjustment. With the aforementioned recursive or iterative operations, the signal processing device 100 may estimate the delay based on the latest obtained information in real time and compensate for the delay on the echo estimation signal and the captured signal, to solve the aforementioned clock un-synchronization problem.

It should be noted that in the embodiments of the invention, once the second delay $\Delta_{m+1}$ has been updated to a value different from $\Delta_m$, in the next iteration (or recursion), the positions of the start sampling point and end sampling point of the captured signal $\underline{d}(m+1)$ will be changed, where the value of the second delay $\Delta$ may be a positive integer or a negative integer. If the value of the second delay $\Delta$ is a positive integer, which means that it needs to obtain the future captured signal. Therefore, in the embodiment of the invention, the signal processing device 100 may delay the captured signal in advance and store it in the captured signal buffer device 120. Through such operation, the newly obtained captured signal can be the future captured signal.

Figure 4:
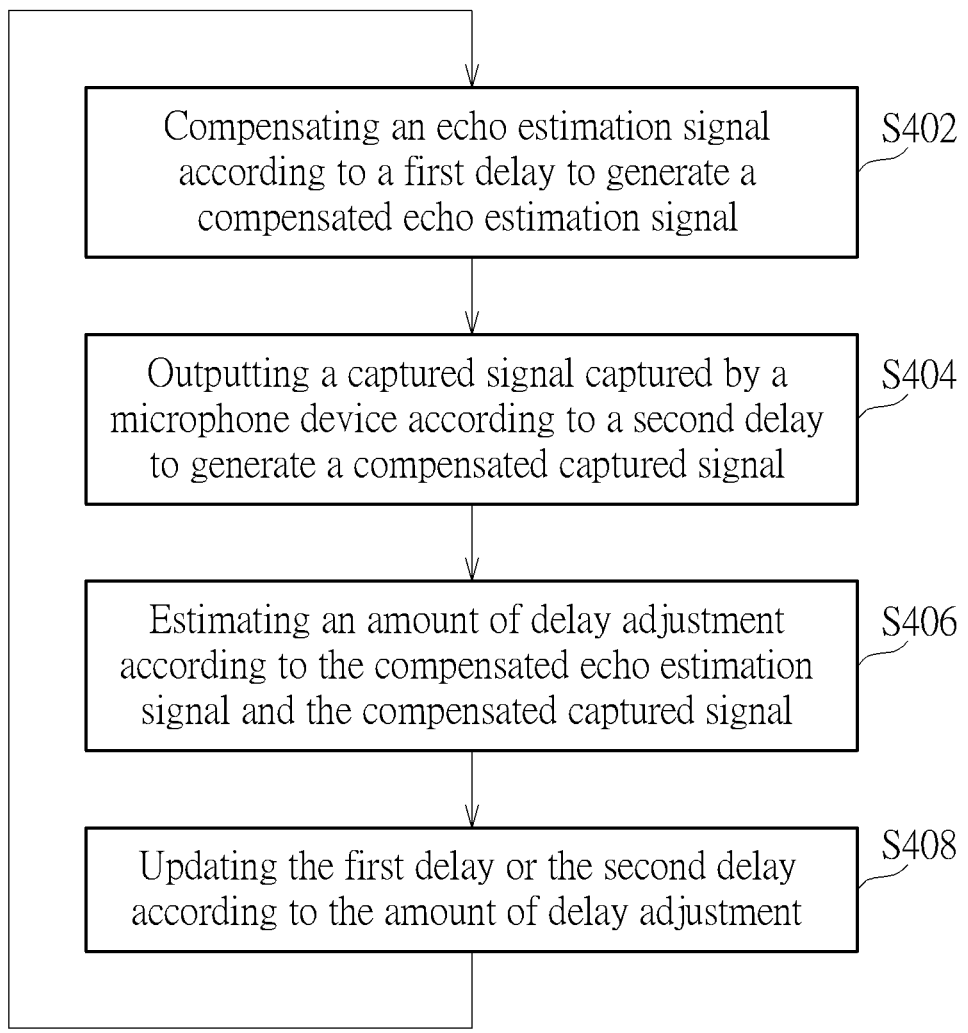
FIG. 4 shows an exemplary flowchart of the delay estimation method according to an embodiment of the invention.

FIG. 4 shows an exemplary flowchart of the delay estimation method according to an embodiment of the invention. The delay estimation method may comprise the following steps:

Step S402: compensating an echo estimation signal according to a first delay to generate a compensated echo estimation signal.

Step S404: outputting a captured signal captured by a microphone device according to a second delay to generate a compensated captured signal.

As discussed above, in the embodiments of the invention, the delay between the reference signal $\underline{x}$(m) and the captured signal $\underline{d}$(m) due to different sampling frequencies may be divided into two parts including a fractional delay and an integer delay. Therefore, the first delay is a fraction with a value being limited between the upper bound $\Omega_U$ and the lower bound $\Omega_L$, and the second delay is an integer.

Step S406: estimating an amount of delay adjustment according to the compensated echo estimation signal and the compensated captured signal.

Step S408: updating the first delay or the second delay according to the amount of delay adjustment.

In the embodiment of the invention, the aforementioned steps are repeatedly or iteratively performed by the corresponding elements of the signal processing device 100. In addition, in the embodiments of the invention, when determining that the minimum energy does not exist or the fine-tuning value is unreasonable, the estimation of the amount of delay adjustment in step S406 may also be skipped or the amount of delay adjustment may be directly set to 0, and the current first delay and the second delay may be directly taken as the updated values in step S408 and then step S402 is returned.

Referring back to FIG. 1, the signal processing device may further comprise an echo cancellation device, such as the adder (or, a subtractor) shown in FIG. 1, or in some embodiments of the invention, the echo estimation device 110 and the adder may be integrated as an echo cancellation device. The echo cancellation device is configured to subtract the compensated echo estimation signal $\underline{y}_\xi$(m) from the compensated captured signal $\underline{d}_A$(m) to generate an output signal. The output signal is an echo cancelled signal.

Figure 5:
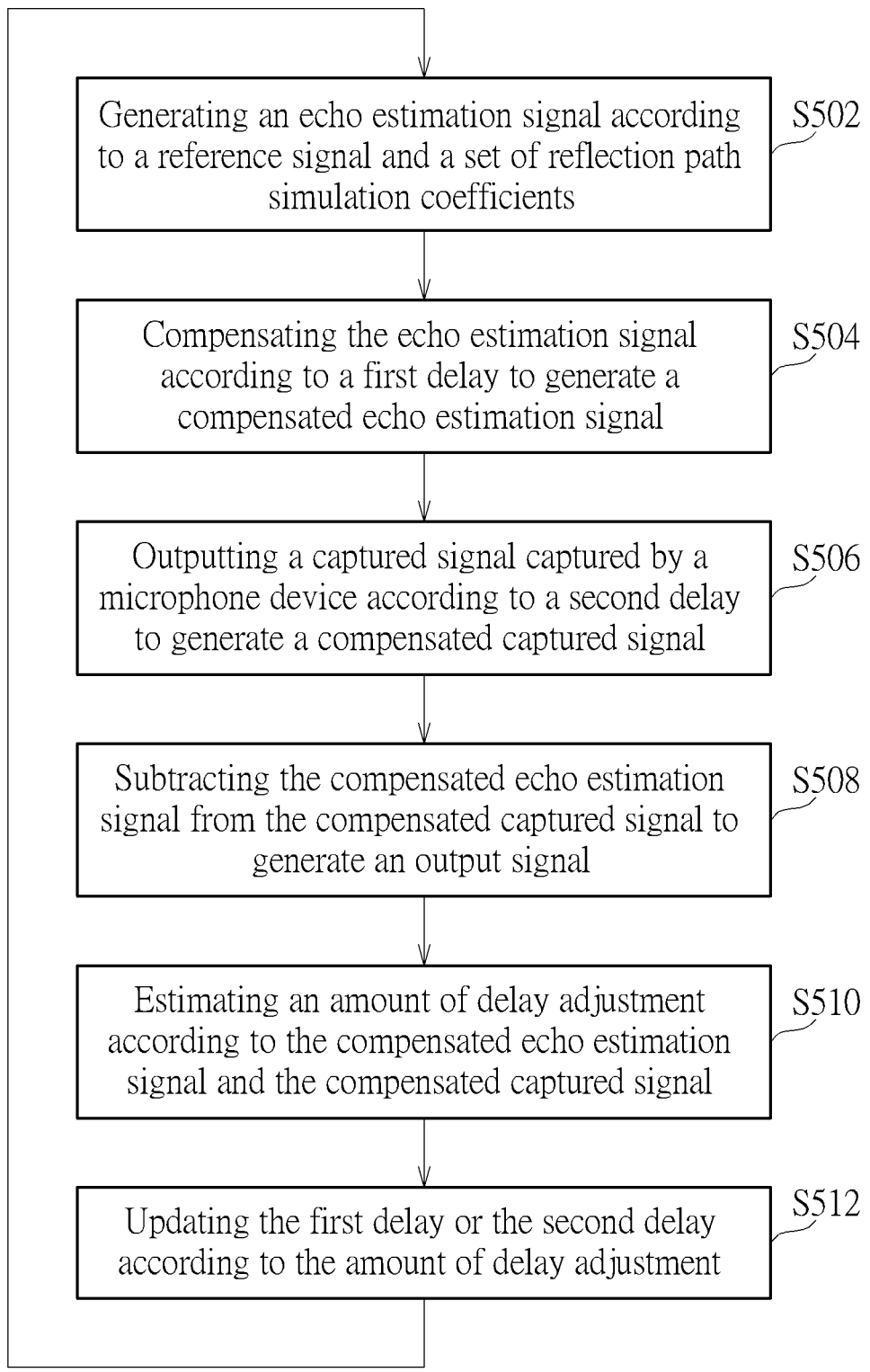
FIG. 5 shows an exemplary flowchart of the echo cancellation method according to an embodiment of the invention.

FIG. 5 shows an exemplary flowchart of the echo cancellation method according to an embodiment of the invention. The echo cancellation method may comprise the following steps:

Step S502: generating an echo estimation signal according to a reference signal and a set of reflection path simulation coefficients.

Step S504: compensating the echo estimation signal according to a first delay to generate a compensated echo estimation signal.

Step S506: outputting a captured signal captured by a microphone device according to a second delay to generate a compensated captured signal.

Step S508: subtracting the compensated echo estimation signal from the compensated captured signal to generate an output signal.

Step S510: estimating an amount of delay adjustment according to the compensated echo estimation signal and the compensated captured signal.

Step S512: updating the first delay or the second delay according to the amount of delay adjustment.

In the embodiment of the invention, the aforementioned steps are repeatedly or iteratively performed by the corresponding elements of the signal processing device 100. In addition, in some cases, the amount of delay adjustment may be set to 0.

In addition, the invention is not limited to performing echo cancellation first and then performing delay estimation. For example, in other embodiments of the invention, steps S504 to S508 may also be performed after steps S510 to S512. That is, the signal processing device may first perform delay estimation and update according to the echo estimation signal and the captured signal currently obtained, and then use the updated first delay and second delay to compensate the echo estimation signal and the captured signal and perform the echo cancellation.

As described above, with the aforementioned operations, the signal processing device 100 may estimate the delay based on the latest obtained information in real time and compensate for the delay on the echo estimation signal and the captured signal, and then perform echo cancellation, through which the aforementioned clock un-synchronization problem can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing device, comprising:
an echo estimation device, configured to generate an echo estimation signal according to a reference signal and a set of reflection path simulation coefficients, and compensate the echo estimation signal according to a first delay to generate a compensated echo estimation signal;
a captured signal buffer device, configured to buffer a captured signal captured by a microphone device and output the captured signal according to a second delay to generate a compensated captured signal; and
a delay estimation device, coupled to the echo estimation device and the captured signal buffer device and configured to estimate an amount of delay adjustment according to the compensated echo estimation signal and the compensated captured signal and update the first delay or the second delay according to the amount of delay adjustment,
wherein a difference between an upper bound and a lower bound of the first delay is smaller than or equal to 1.

2. The signal processing device as claimed in claim 1, wherein the delay estimation device is further configured to adjust the first delay according to the amount of delay adjustment to generate a first value, and determine whether the first value is smaller than the upper bound and greater than the lower bound, and when the first value is not smaller than the upper bound, the delay estimation device reduces the first value to update the first delay and increases the second delay to update the second delay, and when the first value is not greater than the lower bound, the delay estimation device increases the first value to update the first delay and reduces the second delay to update the second delay.

3. The signal processing device as claimed in claim 1, wherein the compensated echo estimation signal is a frequency domain signal, the delay estimation device is configured to generate a plurality of phase shift vectors according to a plurality of delay candidates and generate a plurality of phase-shifted signals according to the compensated echo estimation signal and the plurality of phase shift vectors; the delay estimation device is further configured to respectively calculate a difference between the compensated captured signal and the plurality of phase-shifted signals to generate a plurality of error signals, calculate energy of the error signals in a predetermined frequency band to generate a plurality of energy signals and estimate the amount of delay adjustment according to the plurality of energy signals.

4. The signal processing device as claimed in claim 1, wherein the first delay is a value smaller than 1 and the second delay is an integer value.

5. The signal processing device as claimed in claim 1, wherein after updating the first delay or the second delay, the delay estimation device is further configured to provide the first delay to the echo estimation device and provide the second delay to the captured signal buffer device.

6. The signal processing device as claimed in claim 5, wherein the delay estimation device is configured to repeatedly receive the compensated echo estimation signal and the compensated captured signal from the echo estimation device and the captured signal buffer device, estimate the amount of delay adjustment according to the compensated echo estimation signal and the compensated captured signal and update the first delay or the second delay according to the amount of delay adjustment.

7. The signal processing device as claimed in claim 1, further comprising:
an echo cancellation device, configured to subtract the compensated echo estimation signal from the compensated captured signal to generate an output signal.

8. A delay estimation method, comprising:
compensating an echo estimation signal according to a first delay to generate a compensated echo estimation signal;
outputting a captured signal captured by a microphone device according to a second delay to generate a compensated captured signal;
estimating an amount of delay adjustment according to the compensated echo estimation signal and the compensated captured signal; and
updating the first delay or the second delay according to the amount of delay adjustment,
wherein the first delay is smaller than an upper bound and greater than a lower bound, and a difference between the upper bound and the lower bound of the first delay is smaller than or equal to 1.

9. The delay estimation method as claimed in claim 8, wherein step of updating the first delay or the second delay according to the amount of delay adjustment further comprises:
adjusting the first delay according to the amount of delay adjustment to generate a first value;
determining whether the first value is smaller than the upper bound and greater than the lower bound;
when the first value is not smaller than the upper bound, reducing the first value to update the first delay and increasing the second delay to update the second delay; and
when the first value is not greater than the lower bound, increasing the first value to update the first delay and reducing the second delay to update the second delay.

10. The delay estimation method as claimed in claim 8, wherein the compensated echo estimation signal is a frequency domain signal, and wherein step of estimating the amount of delay adjustment according to the compensated echo estimation signal and the compensated captured signal further comprises:
generating a plurality of phase shift vectors according to a plurality delay candidates;
generating a plurality of phase-shifted signals according to the compensated echo estimation signal and the plurality of phase shift vectors;
calculating a difference between the compensated captured signal and the plurality of phase-shifted signals, respectively, to generate a plurality of error signals;
calculating energy of the error signals in a predetermined frequency band to generate a plurality of energy signals; and
estimating the amount of delay adjustment according to the plurality of energy signals.

11. The delay estimation method as claimed in claim 8, wherein the first delay is a value smaller than 1 and the second delay is an integer value.

12. The delay estimation method as claimed in claim 8, wherein steps comprised in the delay estimation method are iteratively performed.

13. An echo cancellation method, comprising:
generating an echo estimation signal according to a reference signal and a set of reflection path simulation coefficients;
compensating the echo estimation signal according to a first delay to generate a compensated echo estimation signal;
outputting a captured signal captured by a microphone device according to a second delay to generate a compensated captured signal;
subtracting the compensated echo estimation signal from the compensated captured signal to generate an output signal;
estimating an amount of delay adjustment according to the compensated echo estimation signal and the compensated captured signal; and
updating the first delay or the second delay according to the amount of delay adjustment,
wherein the first delay is a value smaller than 1 and the second delay is an integer value.

14. The echo cancellation method as claimed in claim 13, wherein steps comprised in the echo cancellation method are iteratively performed.

15. The echo cancellation method as claimed in claim 13, wherein step of updating the first delay or the second delay according to the amount of delay adjustment further comprises:
adjusting the first delay according to the amount of delay adjustment to generate a first value;
determining whether the first value is smaller than the upper bound and greater than the lower bound;
when the first value is not smaller than the upper bound, reducing the first value to update the first delay and increasing the second delay to update the second delay; and
when the first value is not greater than the lower bound, increasing the first value to update the first delay and reducing the second delay to update the second delay.

* * * * *